(12) United States Patent
O'Connell

(10) Patent No.: US 11,994,962 B2
(45) Date of Patent: May 28, 2024

(54) CONCURRENT OPERATION OF INPUT/OUTPUT (IO) MODULES IN A DUPLEX CONFIGURATION

(71) Applicant: Rockwell Automation Technologies, Inc., Mayfield Heights, OH (US)

(72) Inventor: John R. O'Connell, Painesville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 206 days.

(21) Appl. No.: 17/519,268

(22) Filed: Nov. 4, 2021

(65) Prior Publication Data

US 2023/0136454 A1  May 4, 2023

(51) Int. Cl.
*G06F 11/20* (2006.01)
*G06F 1/26* (2006.01)

(52) U.S. Cl.
CPC .......... *G06F 11/2015* (2013.01); *G06F 1/266* (2013.01)

(58) Field of Classification Search
CPC ............................. G06F 11/2015; G06F 1/266
See application file for complete search history.

(56) References Cited

U.S. PATENT DOCUMENTS

| | | |
|---|---|---|
| 4,520,416 A | 5/1985 | Karash |
| 5,036,452 A | 7/1991 | Loftus |
| 6,411,119 B1 | 6/2002 | Feldtkeller |
| 7,652,393 B2 | 1/2010 | Moth |
| 8,772,964 B2 | 7/2014 | Beg et al. |
| 9,093,860 B2 | 7/2015 | Beg |
| 9,172,271 B2 | 10/2015 | Beg et al. |
| 9,594,097 B2 | 3/2017 | Bogner et al. |
| 9,735,692 B1 | 8/2017 | Lu et al. |
| 10,082,856 B1 | 9/2018 | Owen et al. |
| 10,631,426 B1 | 4/2020 | Lostoski et al. |
| 10,684,611 B2 | 6/2020 | O'Connell et al. |

(Continued)

FOREIGN PATENT DOCUMENTS

| | | |
|---|---|---|
| CN | 110879565 A | 3/2020 |
| DE | 19814097 C1 | 3/2000 |

(Continued)

OTHER PUBLICATIONS

Extended European Search Report for Application No. 22205345.6 dated Apr. 5, 2023, 10 pages.

(Continued)

*Primary Examiner* — Nimesh G Patel
(74) *Attorney, Agent, or Firm* — Fletcher Yoder, P.C.

(57) ABSTRACT

Embodiments of this present disclosure may include a system that may include a first input/output (IO) module, which may output a first current output. The first IO module may be coupled to a first terminal and a second terminal. The system may include a second IO module that may output a second current output. The second IO module may be coupled to the first terminal and the second terminal. The system may include a load device coupled to the first terminal and the second terminal. The load device may operate based on the first current output and the second current output. The system may include one or more control systems that receive an instruction to perform a coordinated handoff to the first IO module.

20 Claims, 10 Drawing Sheets

(56) References Cited

U.S. PATENT DOCUMENTS

| | | |
|---|---|---|
| 10,838,386 B1 | 11/2020 | Wrobel et al. |
| 10,886,776 B1* | 1/2021 | Dias .................. G05B 23/0289 |
| 10,985,477 B1 | 4/2021 | Wrobel et al. |
| 10,986,748 B1 | 4/2021 | Wrobel et al. |
| 2003/0204777 A1 | 10/2003 | Kojori |
| 2009/0267582 A1 | 10/2009 | Prodic et al. |
| 2010/0007216 A1 | 1/2010 | Chojecki et al. |
| 2011/0184579 A1 | 7/2011 | Nilsen et al. |
| 2012/0098338 A1* | 4/2012 | Lew .................. H02J 9/061 |
| | | 307/29 |
| 2013/0138365 A1 | 5/2013 | Etaati et al. |
| 2015/0331468 A1 | 11/2015 | Jau et al. |
| 2017/0170733 A1* | 6/2017 | Ferencz .................. H02J 9/061 |
| 2017/0220089 A1* | 8/2017 | Mathew .................. G06F 1/263 |
| 2018/0052503 A1 | 2/2018 | Sharma et al. |
| 2018/0252777 A1 | 9/2018 | Straub |
| 2018/0292801 A1 | 10/2018 | Tonet |
| 2018/0351547 A1 | 12/2018 | Chawla |
| 2019/0121413 A1* | 4/2019 | Tsai .................. G06F 1/263 |
| 2019/0366953 A1 | 12/2019 | Gainreddy et al. |
| 2020/0303922 A1 | 9/2020 | Fukuhara et al. |
| 2021/0148968 A1 | 5/2021 | Wells et al. |
| 2022/0376608 A1* | 11/2022 | Goodson, II ........ H02M 3/1584 |
| 2023/0015527 A1 | 1/2023 | Zipf |

FOREIGN PATENT DOCUMENTS

| | | |
|---|---|---|
| DE | 102004034451 A1 | 2/2006 |
| EP | 0985987 A2 | 3/2000 |
| EP | 3798769 A1 | 3/2021 |
| GB | 2567650 B | 4/2019 |
| JP | H06120787 A | 4/1994 |
| JP | 2017050933 A | 3/2017 |

OTHER PUBLICATIONS

Extended European Search Report for Application No. 22198001.4 dated Feb. 21, 2023, 10 pages.
Extended European Search Report for Application No. 22198006.3 dated Feb. 10, 2023, 12 pages.
Extended European Search Report for Application No. 22189913.1 dated Feb. 20, 2023, 8 pages.
Patoka, M., "Fundamentals of power system ORing," EETimes, https://www.eetimes.com/fundamentals-of-power-system-oring/, published Mar. 21, 2007, 6 pages.
U.S. Appl. No. 17/410,659, filed Aug. 24, 2021, John R. O'Connell.
U.S. Appl. No. 17/485,830, filed Sep. 27, 2021, Stephen E. Denning.
U.S. Appl. No. 17/485,849, filed Sep. 27, 2021, Stephen E. Denning.

* cited by examiner

CONCURRENT OPERATION OF INPUT/OUTPUT (IO) MODULES IN A DUPLEX CONFIGURATION

BACKGROUND

This disclosure generally relates to industrial automation systems and, more particularly, to control systems and methods based on concurrent operation of redundantly connected distributed modular input/output (IO) devices (e.g., IO modules) that jointly supply a load.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. In addition, one or more components of the automation control and monitoring systems, such as programming terminals, automation controllers, input/output (IO) modules, communication networks, human-machine interface (HMI) terminals, and the like, may use the statuses and/or collected information to provide alerts to operators to change or adjust an operation of one or more components of the industrial automation system (e.g., such as adjusting operation of one or more actuators), to manage the industrial automation system, or the like.

Availability of the industrial automation system may be stated in terms of the availability of the service it provides to operators or owners. It may not be acceptable to have a portion of the industrial automation system be offline while a repair occurs. Nor may it be acceptable to have a portion of the industrial automation system down while planned maintenance or upgrades are performed. An example minimum level of availability for petrochemical applications may be "five-nines," or service availability 99.999% percent of the time. This means that the industrial automation system can be down for a maximum of about 5 minutes a year. Five-nines may be found in customer specifications that define industrial automation system target operations, such as a target high availability for process control systems and/or safety instrumented systems to implement. The industrial automation system may include a number of critical subsystems, which may be expected to achieve a much higher level of availability to meet the target availability. However, the availability should be balanced with reliability. For example, an industrial automation system may be highly available (e.g., because the system is repairable) and not be very reliable due to occurrence of undetected operations that cause the industrial automation system to go fully or partially offline. Thus, industrial automation systems and methods that promote high availability and improve system reliability may be desired.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a first input/output (IO) module that may output a first current output. The first IO module may be coupled to a first terminal and a second terminal. The system may include a second IO module that may output a second current output. The second IO module may be coupled to the first terminal and the second terminal. The system may include a load device coupled to the first terminal and the second terminal. The load device may operate based on the first current output and the second current output. The system may include one or more control systems that receive an instruction to perform a coordinated handoff to the first IO module. The one or more control systems may send a first command to the first IO module to increase the first current output in response to receiving the instruction and send a second command to the second IO module to decrease the second current output.

In another embodiment, a system may include a first input/output (IO) module that may receive a first current input. The first IO module may be coupled to a first terminal and a second terminal. The system may include a second IO module configured to receive a second current input, and the second IO module may be coupled to the first terminal and the second terminal. The system may include a load device coupled to the first terminal and the second terminal. The load device may output the first current input and the second current input. Furthermore, the system may include one or more control systems. The one or more control systems may receive an instruction to perform a coordinated handoff to the second IO module; send a first command to the first IO module to adjust a first resistance of the first IO module in response to receiving the instruction; and send a second command to the second IO module to adjust a second resistance of the second IO module.

In yet another embodiment, a method may include receiving, via processing circuitry, an instruction to perform a coordinated handoff of a digital load device to a first input/output (IO) module. The digital load device may be coupled to the first IO module and a second IO module via at least two terminals. The method may also include detecting, via the processing circuitry, a first digital state of the first IO module in response to receiving the instruction and detecting, via the processing circuitry, a second digital state of the second IO module. The method may include sending, via the processing circuitry, a command to open at least one switch of the second IO module to disconnect the second IO module from the digital load device in response to determining that the first digital state and the second digital state are the same.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
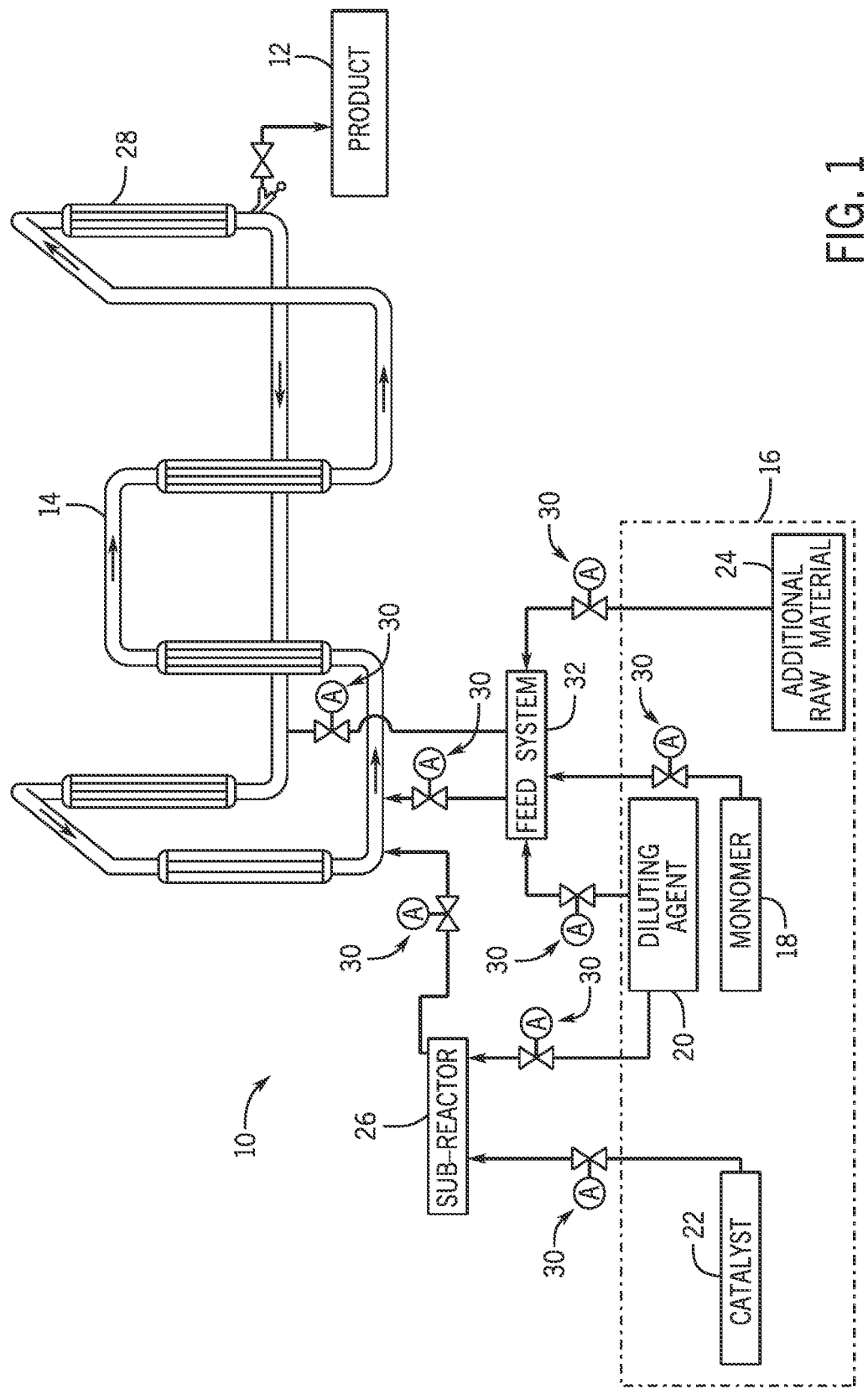
FIG. 1 is a diagrammatic representation of an example petrochemical-related process, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed towards industrial automation-related systems and methods that use redundant, concurrently operating IO modules to send or receive analog inputs, analog outputs, digital inputs, and/or digital outputs to a shared load. Use of concurrent and redundant IO modules may provide the industrial automation system with an increased capability to respond to changes in component-level operations and electrical faults and may result in improved reliability and higher system availabilities. High availability may be manifested as, for example, a high mean time to failure (MTTF) combined with a low mean time to repair (MTTR).

To elaborate, redundant power supplies may provide power two or more power conditioners, which may redundantly and concurrently power one or more IO modules. Two or more IO modules may be paired in a duplex configuration to redundantly and concurrently interface with a shared load. For example, a secondary power conditioner may back up a primary power conditioner, such that the secondary power conditioner and the primary power conditioner may concurrently supply the two or more IO modules that redundantly and concurrently couple to the shared load. Since the IO modules interface with the shared load at the same time, if the primary IO module and/or primary power conditioner were to go offline, then the load may be switched to communicate with the secondary IO module without causing interruption to operation of the load. Indeed, if the primary IO module, the primary power supply, and/or the primary power conditioner become unavailable, the secondary power supply and the secondary power conditioner become the power source of the load and/or the secondary IO module becomes the communication interface of the load.

When coupled to the two or more IO modules, the load may lose the ability to communicate with a distributed control system when both IO modules are unavailable but may remain able to communicate if the primary IO module is lost. Consequently, common causes of operational downtime may occur less since there is less opportunity for a single fault to make both IO modules unavailable to the load. In other words, unless there is an outage affecting both power sources for both IO modules, power will still be available to the load. Furthermore, since the secondary IO module provides power to the load concurrently with the primary IO module, even if the primary IO module were to become unavailable, the load would not have to be switched to the secondary IO module to receive power. Since there is no "dead time" during engagement and disengagement between the load and the IO modules, the load may experience fewer signal transient noises than typically introduced during a switching process. Additional redundancy systems are also described herein to further improve industrial automation reliability and availability, which may further reduce a likelihood of the load going offline.

This concurrent and redundant operation may also make it difficult or undesirable to take either IO module offline, such as for validation testing or replacement. Indeed, taking one IO module offline may disturb signals provided from the other IO module. To remedy this, the two or more IO modules may perform coordinated handoff operations. To transfer a load from being supplied by a primary IO module and a secondary IO module, a control system may perform a coordinated handoff operation to transfer the shared load to just one of the IO modules.

During the coordinated handoff operation, the control system may decrease an output from or input to (e.g., power, current, voltage) the primary IO module at a rate matching that used to increase an output from or input to (e.g., power, current, voltage) the secondary IO module. This may be done incrementally or by moving the respective outputs to set point values. After the control system has determined that the load is switched from being jointly supplied by the IO modules to just being supplied by the secondary IO module, the load may continue its normal operation without causing disruptions to any connected devices. In some cases, such as when a maintenance operation is to be performed, the control system may decouple the primary IO module from the load after the load is shifted to the secondary IO module. In some embodiments, the coordinated handoff operation may be used by the control system to perform a diagnostic operation. One example diagnostic operation may involve the control system confirming that the secondary IO module is capable of supplying the full load in the event that the primary IO module becomes unavailable in the future for periodic diagnostic testing operations. Another example diagnostic operation may involve the control system performing a full load test on the channel power supply (e.g., terminal T1) when in a duplex configuration and/or on the Terminal T2 when in a duplex, analog output mode.

Independent operation of different portions of the industrial automation system may enhance diagnostic capabilities of the industrial automation system. Indeed, having both IO modules active and participating in supplying the load may enable advanced module diagnostics to be performed that are transparent to the load, and thus do not impact load operations. System-wide diagnostic operations may be performed based on the monitored operation of the different individual IO modules (e.g., loads) of the industrial automation system. The IO modules may also include sensing circuitry to obtain measurements of current, voltage, temperature, or any metric, of portions of the power conditioners, of the load, or the like for diagnostic operations. The measurements may enhance in-field control determinations. For example, a local control system of one device may adjust its operation based on a measurement made in another device without intervention of a system-wide control system. Health monitoring provided by the diagnostic capabilities may enable detection of backplane, power conditioner, and/or power supply inability to support a full load in the event that one of the power supplies is unavailable. Health monitoring at the IO module level (e.g., load module level) may also enable detection of a load module that unable to support its own load in the event of the failure of one of the power rails.

Using consistent or similar (e.g., universal) IO circuitry within the IO modules may further improve industrial automation system operation. Since IO modules with certain IO circuitry may be modular and identical relative to one another, using these IO modules may help conservation of resources when maintaining a stock of IO modules for maintenance operations of the industrial automation system and may reduce a likelihood of operator error in servicing and/or installing the IO modules.

It is noted that sometimes the IO modules operating in a concurrent operation provide an equal amount of power to the load. However, it may be desired for the IO modules to generate or receive unequal amounts of power and/or amounts of an output, such as a voltage output. Indeed, the secondary IO module may have an output voltage set (e.g., an output voltage from a terminal T1) lower than that of the primary IO module to cause the primary IO module to source the power to the load under normal operating conditions. If the primary IO module were to become unavailable, switching the load from being sourced by the primary IO module to being sourced the secondary IO module does not introduce switching transients since the secondary IO module remains coupled to the load during the normal operation and throughout adjustments made to the output voltage from the secondary IO module.

Although the following example environment in which the present embodiments may be implemented is described in terms of a petrochemical application, it should be understood that concurrent and redundant power supplying and distribution systems may also improve operations in other applications. For example, burner management applications, gas production applications, mining applications, and/or other heavy industrial applications may benefit from embodiments described herein, as well as any systems in which improved reliability and efficiency (e.g., less down time) is desired.

By way of introduction, FIG. 1 is a diagrammatic representation of a petrochemical-related process in which embodiments described below may be implemented. In particular, illustrated is an example reactor system 10, such as a polymerization reactor capable of processing olefin monomers, like ethylene or hexene, to produce homopolymers or co-polymers as products 12. Any suitable reactor may be used, including batch, slurry, gas-phase, solution, high pressure, tubular or autoclave reactors, or any combination thereof. For ease of discussion, FIG. 1 refers to a loop reactor 14 for polymerization. However, it should be noted that the discussion set forth below is intended to be applicable, as appropriate, to any petrochemical process, industrial process, manufacturing process, or the like, as a way to provide context to the following discussion of FIGS. 2-9.

Production processes, like the polymerization reactor process shown in FIG. 1, may occur on an ongoing basis as part of a continuous operation to generate products (e.g., product 12). Sometimes a variety of both continuous and batch systems may be employed throughout a production process. Various suppliers may provide reactor feedstocks 16 to the reactor system 10 via pipelines, trucks, cylinders, drums, and so forth. The suppliers may include off-site and/or on-site facilities, including olefin plants, refineries, catalyst plants, on or off-site laboratories, and the like. Examples of possible feedstocks 16 include olefin monomers 18, diluents or diluting agents 20, catalysts 22, and/or other additives. The other feed components, additional raw materials 24, may also be provided to the reactor 14. Feedstocks 16 may change when using different manufacturing processes and/or when manufacturing a different final product. The feedstocks 16 may be stored or processed in any suitable vessel or process, such as in monomer storage and feed tanks, diluent vessels, catalyst tanks, co-catalyst cylinders and tanks, treatment beds like molecular sieve beds and/or aluminum packing, and so forth, prior to or after being received at the reactor system 10. The reactor system 10 may include one type of reactor in a system or multiple reactors of the same or different type, and desired processing conditions in one of the reactors may be different from the operating conditions of the other reactors.

The product 12 may be moved from the reactor system 10 for additional processing, such as to form polymer pellets from the product 12. In general, the product 12, or processed product (e.g., pellets) may be transported to a product load-out area for storage, blending with other products or processed products, and/or loading into railcars, trucks, bags, ships, and so forth, for distribution to customers.

Processes, like the reactor system 10, may receive or process feedstocks 16 at relatively high pressures and/or relatively high temperatures. For example, a hydrogen feedstock may be handled by the reactor system 10 via pipeline at approximately 900-1000 pounds per square inch gauge (psig) at psig at 90-110° F. Furthermore, some products may be generated using highly reactive, unstable, corrosive, or otherwise toxic materials as the feedstock 16 or as intermediate products, such as hydrogen sulfide, pure oxygen, or the like. Heat, pressure, and other operating parameters may be employed appropriately to obtain appropriate reaction conditions, which may increase a reactivity, instability, or corrosive nature of the feedstock 16. These materials may be desired to be processed and transported using reliable and highly available systems, for example, to reduce a likelihood of a release event from occurring.

Each of the feedstocks 16, sub-reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 68 as needed to remove the generated heat and to maintain the temperature within the desired range, such as between approximately 150° F. to 250° F. (65° C. to 121° C.) for polyethylene.

Figure 2:
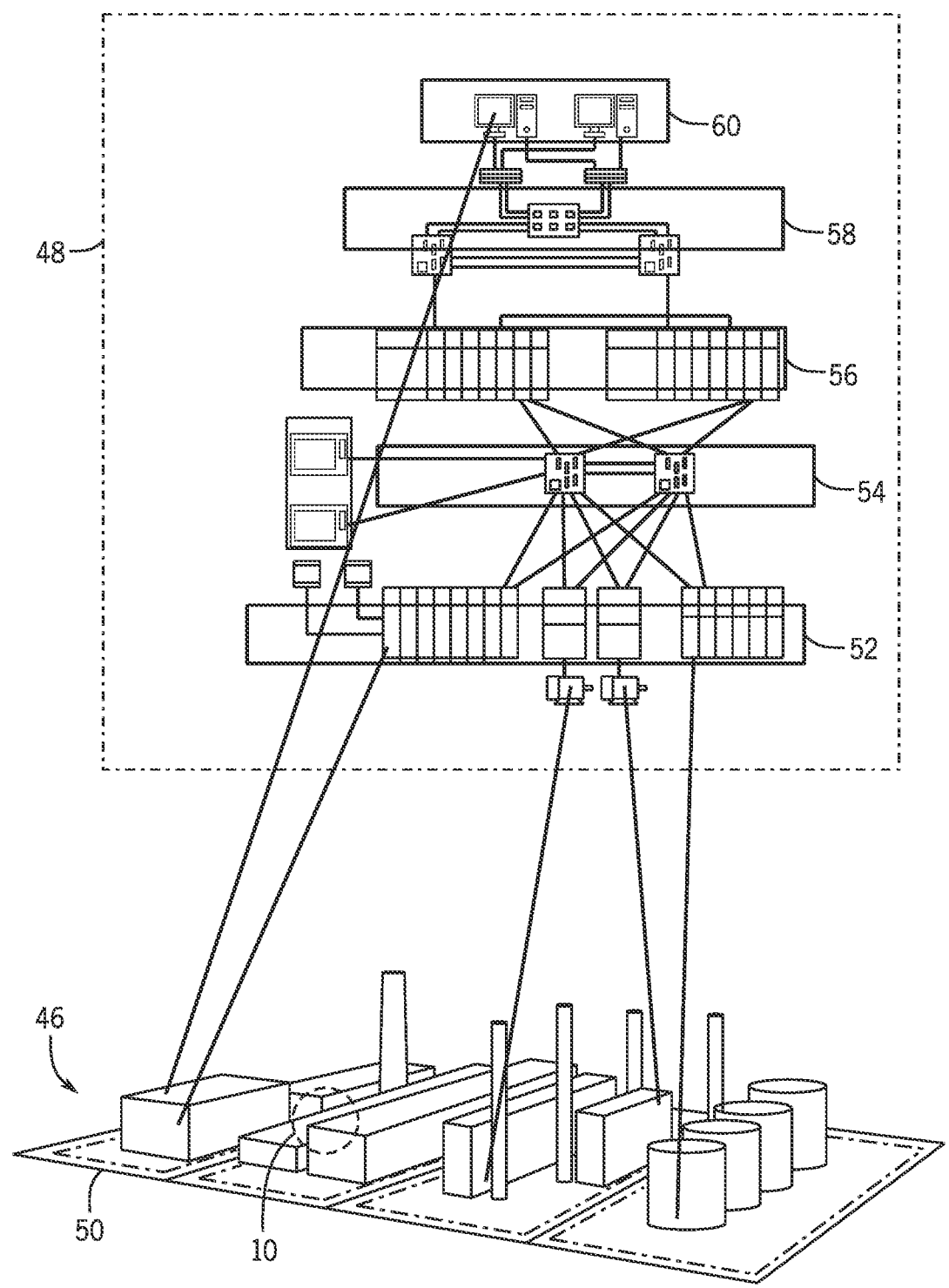
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like. Care may be taken when adjusting operating parameters since petrochemical manufacturing processing may be highly sensitive to erroneous operation. For example, fractions of a percentage of reliability change in a control system of the reactor system 10 may make a difference between a process being taken offline or a process working as expected.

With the foregoing in mind, the components of the reactor system 10 may be connected to power supplies, power supply conditions, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the reactor system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a stand-alone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., does not use feedback for control), an open loop control system (e.g., uses feedback for control), or may include a combination of both open and closed system components and/or algorithms. Further, in some embodiments, the distributed control system 48 may utilize feed forward inputs. For example, depending on information relating to the feedstocks 16 (e.g., compositional information relating to the catalyst 22 and/or the additional raw material 24, the distributed control system 48 may control the flow of any one or a combination of the feedstocks 16 into the sub-reactor 26, the reactor 14, or the like.

Each of the levels 52, 54, 56, 58, 60 may include component redundancies, which may help provide a high availability control system. For example, within the first level, redundant and concurrently operating backplanes may provide power to each of the IO modules.

Figure 3:
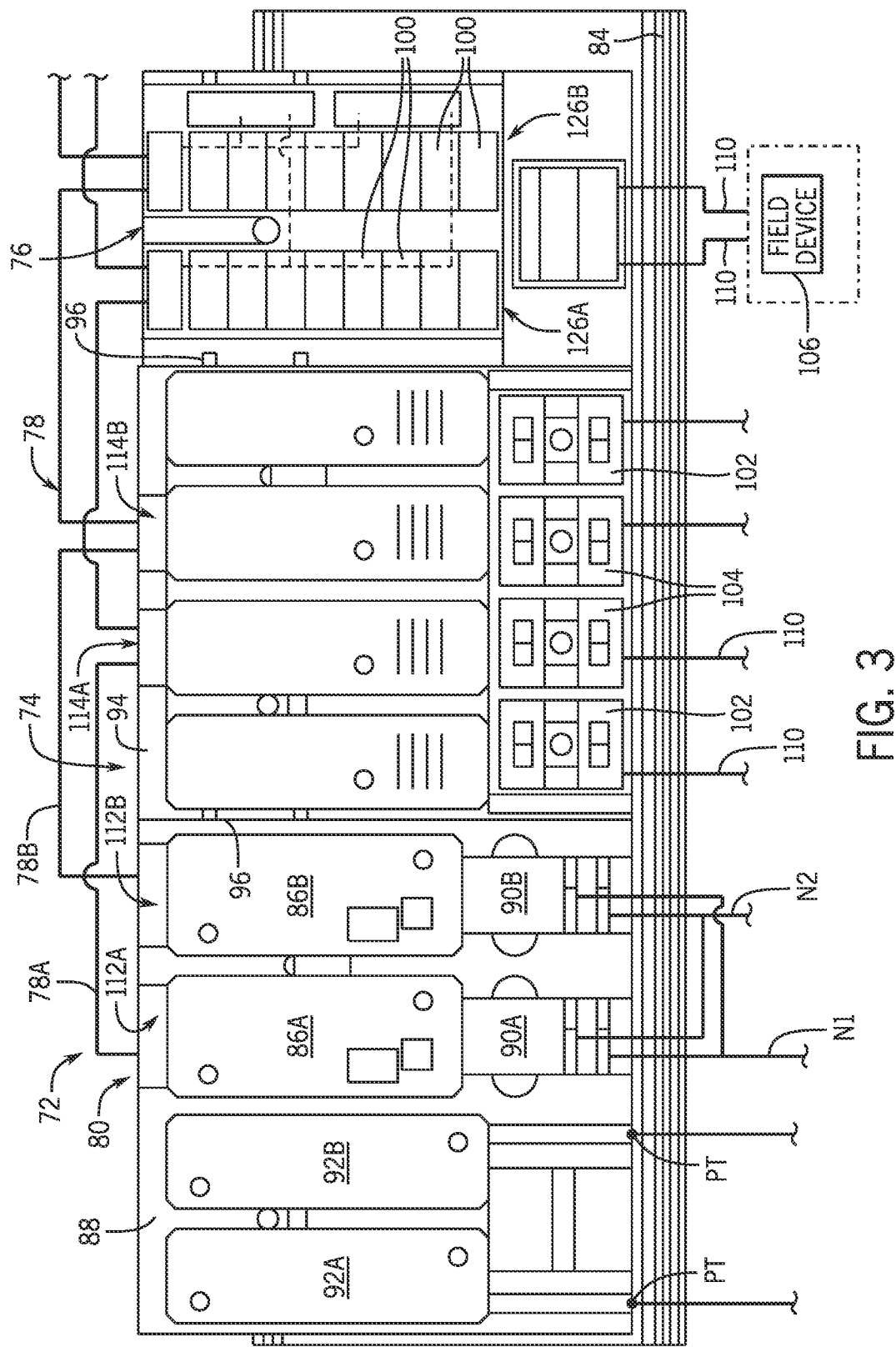
FIG. 3 is an illustration of a distributed modular input/output (IO) system, in accordance with an embodiment.

To elaborate, FIG. 3 is an illustration of an example distributed modular IO system 72 associated with the distributed control system 48 of FIG. 2. The distributed modular IO system 72 may include IO devices 74, an IO module 76 and backplanes 78 (78A, 78B). The distributed modular IO system 72 may include a network adapter 80 having two or more adapter modules 86 (86A, 86B).

The network adapter 80 may be coupled to at least one industrial automation network N1, N2. The first and second redundant industrial automation networks N1, N2 may be Parallel Redundancy Protocol (PRP) LAN networks, Ethernet/IP networks, or other industrial automation networks so that the network adapter 80 may receive data from, transmits data to, and otherwise communicates with one or more industrial control modules, control systems, processing circuitry, or the like, such as one or more programmable logic controllers (PLC), microprocessors, and/or other electronic processors for machine and/or process control.

The network adapter 80 may include a base 82 mounted to the support rail 84 or other support structure. The network adapter 80 may include first and second identical or otherwise redundant adapter modules 86 (86A, 86B) operating in parallel with each other. The redundant adapter modules 86 may each be releasably connected to the adapter base 88. Each of the adapter modules 86 may be operably connected to both the first and second networks N1, N2 by connections in the adapter base 88. The adapter modules 86 may also include electronic circuitry to communicate data with circuitry coupled to the networks N1, N2, with IO devices 74, or with other interconnected components.

The network adapter 80 may include first and second media landing modules 90 (90A, 90B) removably coupled to the first and second adapter modules 86 through the adapter base 88. The media landing boards 90 may each include at least two network connectors NC, such as RJ45 connectors, Small FormFactor Pluggable (SFP) connectors, optical fiber connectors, or the like. The industrial networks N1, N2 may be coupled to the media landing boards 90 via the network connectors NC, and thus be connected to the adapter modules 86 though the media landing boards 90.

The IO device 74 redundant power conditioning and supplying IO modules (power conditioners) 92 (92A, 92B), which may be coupled to the adapter base 88 and may include a power input terminal PT. The power input terminal PT may be used when connecting with at least one source of electrical power, such that the power conditioners 92 may supply system electrical power to the network adapter 80 via the adapter base 88, as well as to other components coupled to the backplane 78. As shown herein the power input terminals PT are removably connected to the adapter base 88 and are operably connected to the power conditioners 92 through the adapter base 88.

The IO device 74 may include a base 94 also mounted to the support rail 84 or another support structure. The base 94 may be located adjacent to base 82. The base 94 may be operably, physically, and/or electrically connected to the base 82 via multi-contact electrical connectors 96 such that the backplane 78 may power and communicate between the network adapter 80, IO devices 74, the industrial networks N, and the like. FIG. 3 shows the backplane 78 as being external to the IO device 74, but those of ordinary skill in the art will recognize that the backplane 78 circuit or network is physically and electrically constructed within and extends through printed circuit boards and other circuitry located in the adapter bases 88 and bases 94 via the electrical connectors 96.

The IO device 74 may include IO processing modules (IO modules) 98 (98A, 98B, 98C, 98D). The IO modules 98 may be removably connected to the base 94 in respective mounting slots via electrical connections, such that each of the IO modules 98 may be operatively coupled to the backplane 78. The IO modules 98 may use the backplane 78 to communicate with the network adapter 80, the other IO (sub) modules 98, 100, and the like. In one embodiment, at least two of the IO modules 98 are identical to each other and operated in parallel with each other to provide a redundancy with respect to each other.

The base 94 may include at least one terminal block 102, which may include cage clamps, spring clamps, screw terminals, or other wiring connectors 104 that are adapted to be connected to field cables or field wiring 110 that are each associated with a field device 106. The field device 106 may be an analog or digital device such as a sensor, flow meter, switch, probe, thermocouple, RTD, encoder, or the like, and the field device 106 may receive input data or transmit output data via the terminal blocks 102.

The network adapter 80 may include independent "adapter" Ethernet switches 112 (112A, 112B), which may be operably connected to, form part of, and establish the backplane 78. Similarly, the IO devices 74 may include independent IO module Ethernet switches 114 (114A, 114B) that may be operably connected to, form part of, and establish the backplane 78. The switches 112 and the switches 114 may be identical but are numbered differently to facilitate description of their operation. The switches 112, 114 may perform a packet switching operation to direct data communication of any suitable backplane network/protocol.

The IO module 76 may be a single-channel IO device that includes one or more removable and replaceable single-channel IO submodules 100. The IO module 76 may include a base 118 adapted for mounting on a support rail 84 or another support structure. The base 118 may include multi-contact electrical connectors 96 to form a portion of the backplanes 78. The IO module 76 may include a terminal block 120 connected to the base 116. The terminal block 120 may include wiring connectors 122 that couple the terminal block 120 to other industrial automation components. The IO module 76 may include Ethernet switches 124 (124A, 124B), each operably coupled to, form part of, and establish the backplane 78.

The IO module 76 may include at least two configurable IO modules 126 (126A, 126B). The configurable IO modules 126 may each be defined by and include separate IO segments or IO submodules 100, which may each be selectively installed on and removable from the base 116. The configurable IO modules 126 may define a group of the IO submodules 100. In this example, the configurable IO modules 126 each include eight, single-channel IO submodules 100, and thus include eight individual IO data channels.

The IO submodules 100 and/or the IO modules 108 may include electronic circuitry to perform a particular type of data input/output (IO) operation, such as a direct current (DC) input, DC output, alternating current (AC) input, AC output, safety input/output, highway addressable remote transducer protocol (HART) input/output, real time data (RTD) and/or thermocouple input and/or output, or other analog or digital input/output for data and signals. Each IO submodules 100 and/or the IO modules 108 may be respectively used for different types of data communication. Furthermore, each IO submodules 100 and/or the IO modules 108 may be associated with a single, dedicated IO data channel operably coupled to a group of one or more wiring connectors 122 of the terminal block 120 (e.g., column of wiring connectors 122). In this way, a field device coupled to the one or more wiring connectors 122 may be associated with a particular IO data channel and may be operably connected to the corresponding IO submodule 100 associated with the same IO data channel. As noted above, the IO submodules 100 and/or the IO modules 108 be selected to be the appropriate IO type (e.g., analog, digital, AC input, AC output, DC input, DC output) as required for the particular field device connected to its associated IO data channel.

As described above, the industrial automation system 46 may transport and process materials that may be classified as hazardous by chemical regulatory agencies and that may be used to produce products worth millions of dollars cumulatively. Consequently, the industrial automation system 46 may be desired to be not only highly reliable but also highly available, such as to satisfy a minimum level of availability for petrochemical applications may of service availability 99.999% percent of the time. To do so, short and long term monitoring operations of the industrial automation system 46 may be used to perform predictive maintenance operations, as well as reactive or other maintenance activities. For example, by monitoring operations of individual components of the industrial automation system 46 alone or in combination with system-wide or unit-wide monitoring operations, maintenance issues may be predicted prior to a component, a unit, and/or the system going offline. Predictive monitoring may improve availability due to, for example, being able to schedule outages of a component, a unit, and/or the system when the monitoring operations has flagged to do a repair or replacement of the portion of the industrial automation system 46. Short and long term monitoring operations of the industrial automation system 46 may be managed by components of the distributed control system 48, for example, by commands to perform specific operations (and resulting data) being propagated throughout the various levels of the distributed control system 48. An example group of components in FIG. 4 may represent a portion of the distributed modular IO system 72 of FIG. 3 associated with the distributed control system 48 but used to control loads at a more local level, such as in the unit 50 or in a nearby unit 50.

Figure 4:
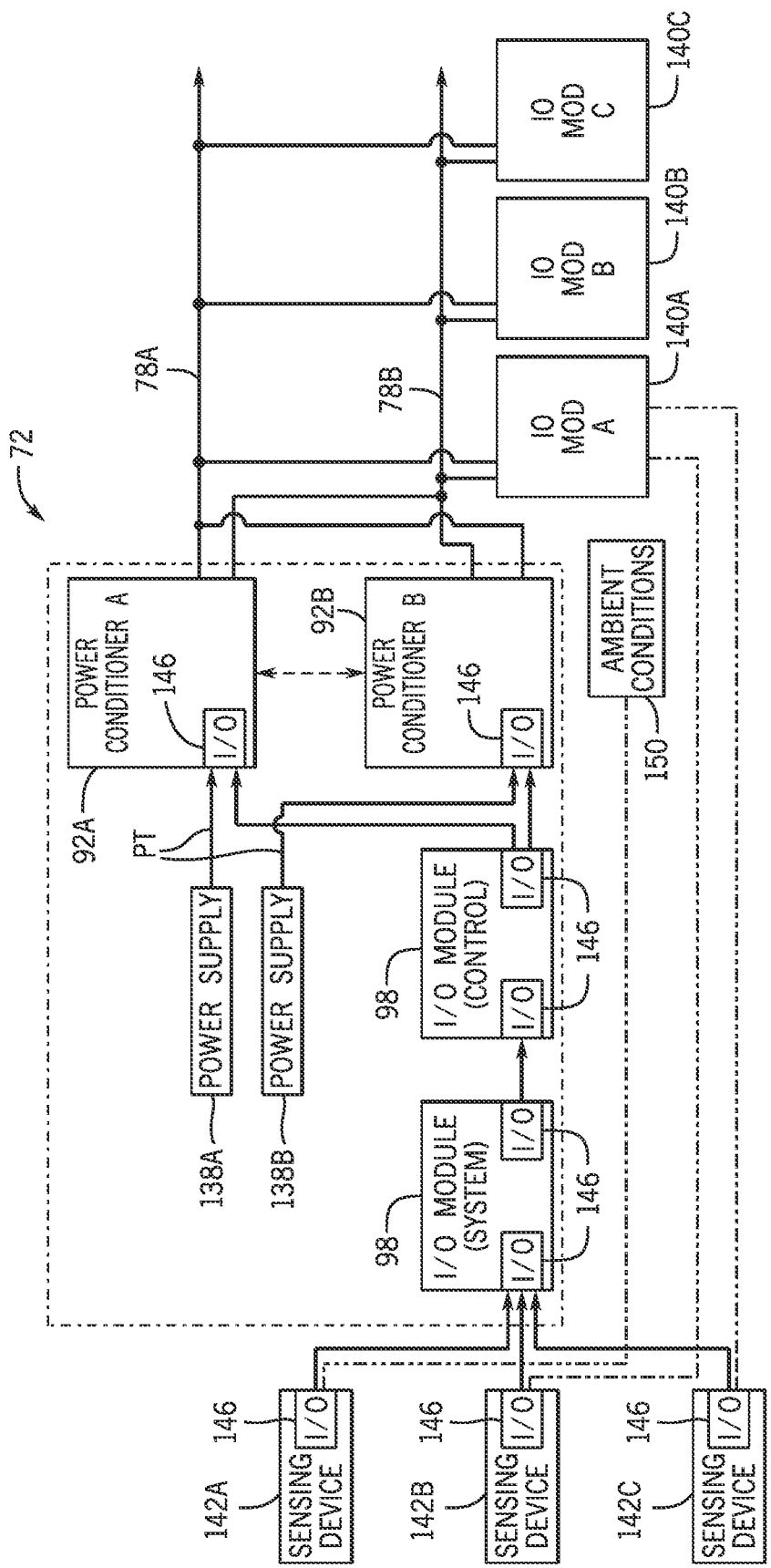
FIG. 4 is a block diagram of the distributed modular IO system of FIG. 3 that includes at least a first IO module and a second IO module, where at least one IO module includes universal IO circuitry of FIG. 5, in accordance with an embodiment.

To elaborate, FIG. 4 is a block diagram of some of the components of the distributed modular IO system 72 of FIG. 3. The power conditioners 92 may couple respectively to power supplies 138 (138A, 138B) and may include power converting circuitry to transform an electrical property of signals received from the power supplies 138 before outputting electrical signals to the backplanes 78. Sometimes the field devices 106 may include IO modules 140 (140A, 140B, 140C) associated with downstream loads and sensing devices 142 (142A, 142B, 142C). The IO modules 140 may additionally or alternatively couple to the IO submodules 100 and/or the IO modules 108 of FIG. 3 via the backplanes 78

Additional communication paths may be included between the IO modules 140 and the power conditioners 92. The IO modules 140 may each receive analog or digital signals from the backplane 78A, from the backplane 78B, or both. Signals sent via the backplanes 78 may change individual operation of the IO modules 140. For example, IO modules 140 may be a system interface for a downstream IO module coupled to the IO module 140, and thus may supply power from the power conditioners 92 to the system side of downstream components coupled to the IO module 140. IO circuitry 146 of the power conditioners 92 may be used to provide feedback, such as via DC signals transmitted between the IO module 98 (control) and the power conditioner 92A, 92B. The feedback may relate to a status of the IO module 140 and/or of components coupled to the IO module 140, such as whether one or both connections to the backplane 78 are lost, or other suitable control operation related statuses or data. The IO module 98 (control) or the IO module 98 (system) may be programmed, and operated, as a distributed modular IO system 72 control system, and/or other control circuitry may be included. For ease of description, the IO module 98 (control) is described herein as a primary control system of at least this portion of the distributed modular IO system 72. In some cases, the IO module 98 (system) may coordinate received signals and/or operations of the IO module 98 (control) with larger system operations by communicating with other portions of the distributed modular IO system 72.

The sensing devices 142 may sense operating parameters (e.g., speed, current, output voltage) of the IO module 140 and/or of ambient conditions 150 that may affect operation of the industrial automation system 46. The sensing devices 142 may acquire the sensed data and may output the sensed data to other control circuitry via input/output (IO) circuitry 146, such as control and processing circuitry described in FIG. 3. The sensed data may be of any suitable format, and thus may include one or more analog electrical signals, digital data signals, pulse-width-modulated data signals, or the like.

After the IO module 98 (system) receives the sensed data from the sensing devices 142, the IO module 98 (system) may transmit the sensed data to the IO module 98 (control). The IO module 98 (control) may analyze the sensed data to determine one or more outputs to send to the IO modules 140. In some cases, this includes provision of a command to one or more the power conditioners 92 to change how current outputs from the power conditioners 92 coupled to the IO modules 140 as a redundant pair. The power conditioners 92 may provide current concurrently to the IO modules 140. As such, to test output currents from one of the power conditioners 92, one of the power conditioners 92 may provide power to the IO module 140, while the other power conditioner 92 does not. As a result, the IO modules 140 may connect to the power conditioners 92 and avoid an increased risk of failure if one of the connected power conditioners 92 is unable to provide the appropriate power.

Communication pathways with the one or more IO modules 140 may also enable the upstream control circuitry to diagnose or monitor the IO modules 140. In the event that one of the backplanes 78 is offline, control circuitry of the power conditioners 92 and/or of the IO modules 140 may continue to receive power from the other of the backplanes 78, thereby avoiding operational interruptions from losing power and from having to switch on the other backplane 78 to the components. Components, including the control circuitry of the power conditioners 92 and/or of the IO modules 140, may be coupled to the two or more backplanes 78.

Each of the IO modules 140 may dynamically provide differing resistances in each of its channels, as may be used to provide different modes of operation for that channel. In the different modes of operation, the IO module 140 may send and/or receive digital signals, analog signals, or both types of signals. When the IO module 140 includes one channel, that single channel may be operated in any of the different modes of operation (e.g., analog input, analog output, digital input, digital output) but at different times.

When in these different modes of operation, the IO module 140 may support the different IO signals types. The IO modules 140 may also support Highway Addressable Remote Transducer (HART) communications; a digital industrial automation protocol, which may communicate over legacy 4-20 milliamp (mA) analog instrumentation wiring; User Association of Automation Technology in Process Industries (NAMUR); and the like. Indeed, universal IO circuitry of the IO modules 140, which may include the channel with the configurable resistance, may provide a resistance to be established in the input or output channel for suitable operable in each of these IO types. The universal IO circuitry may dynamically change the channel resistance by adjusting channel voltage and channel current to maintain the desired channel resistance. These adjustments may be partially based on the current and/or voltage contribution from a load of the IO module 140, such that the net current and voltage set the desired channel resistance. In some examples, the universal IO circuitry may adjust the resistance by changing resistor values, by configuring a digital potentiometer, by adjusting a resistor ladder, or the like. Indeed, each of these methods of resistance adjustment may benefit from being able to provide a wide variety of resistances without using discrete physical resistor components for each resistance provided.

Figure 5:
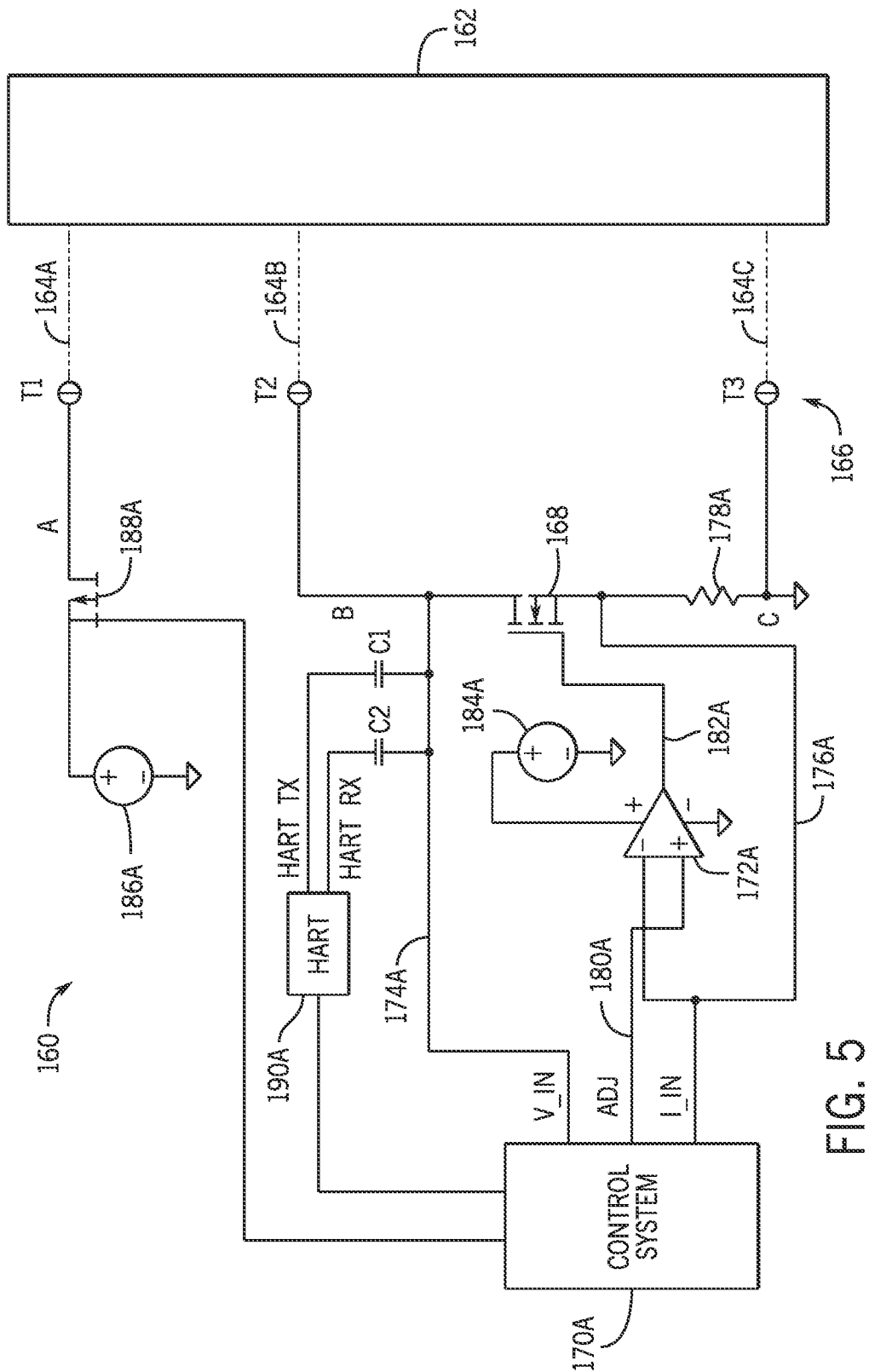
FIG. 5 is a circuit diagram of the universal IO circuitry of the first IO module of FIG. 4, in accordance with an embodiment.
Figure 6:
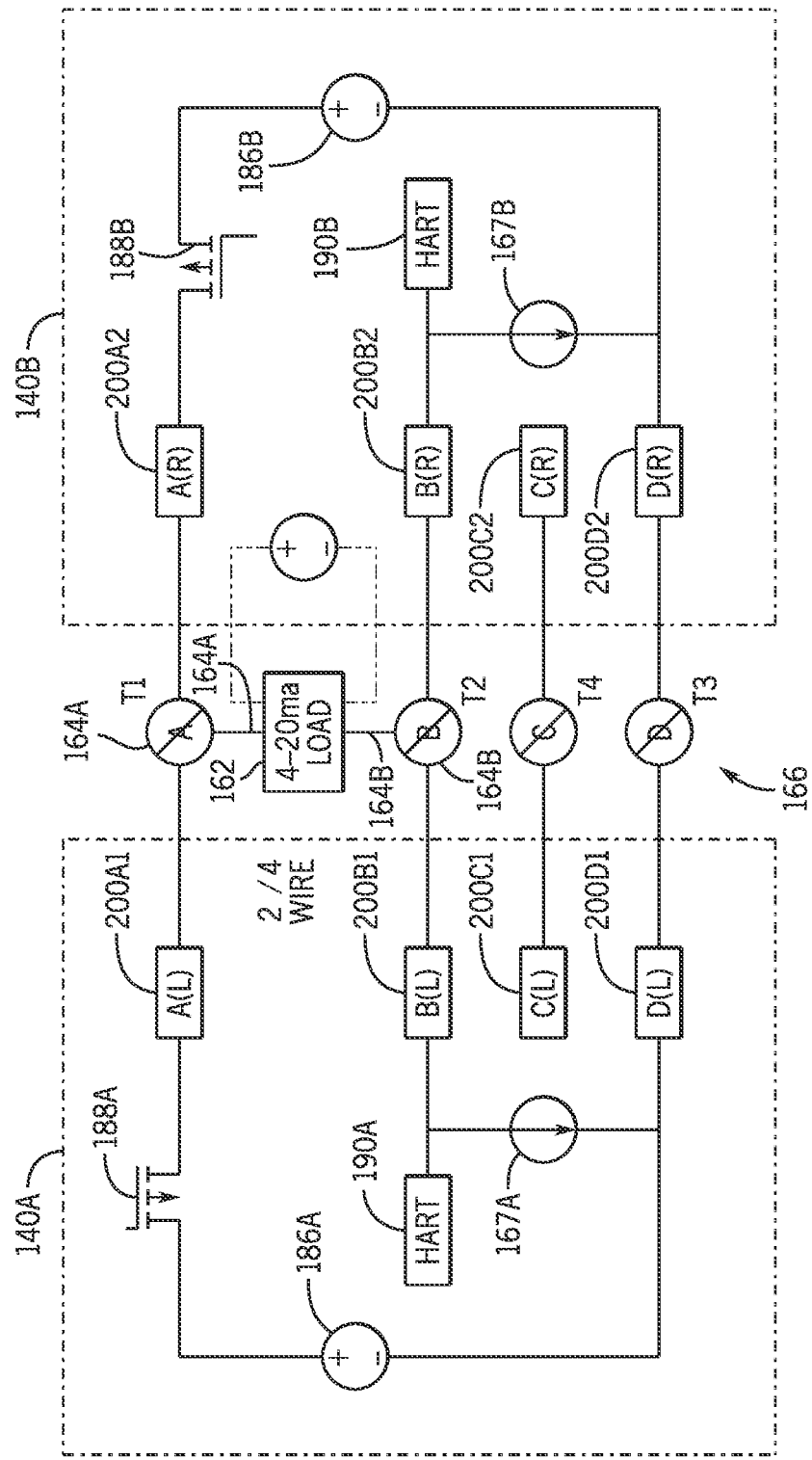
FIG. 6 is a circuit diagram of the first IO module and the second IO module being concurrently and redundantly coupled to a load via an analog output, in accordance with an embodiment.
Figure 7:
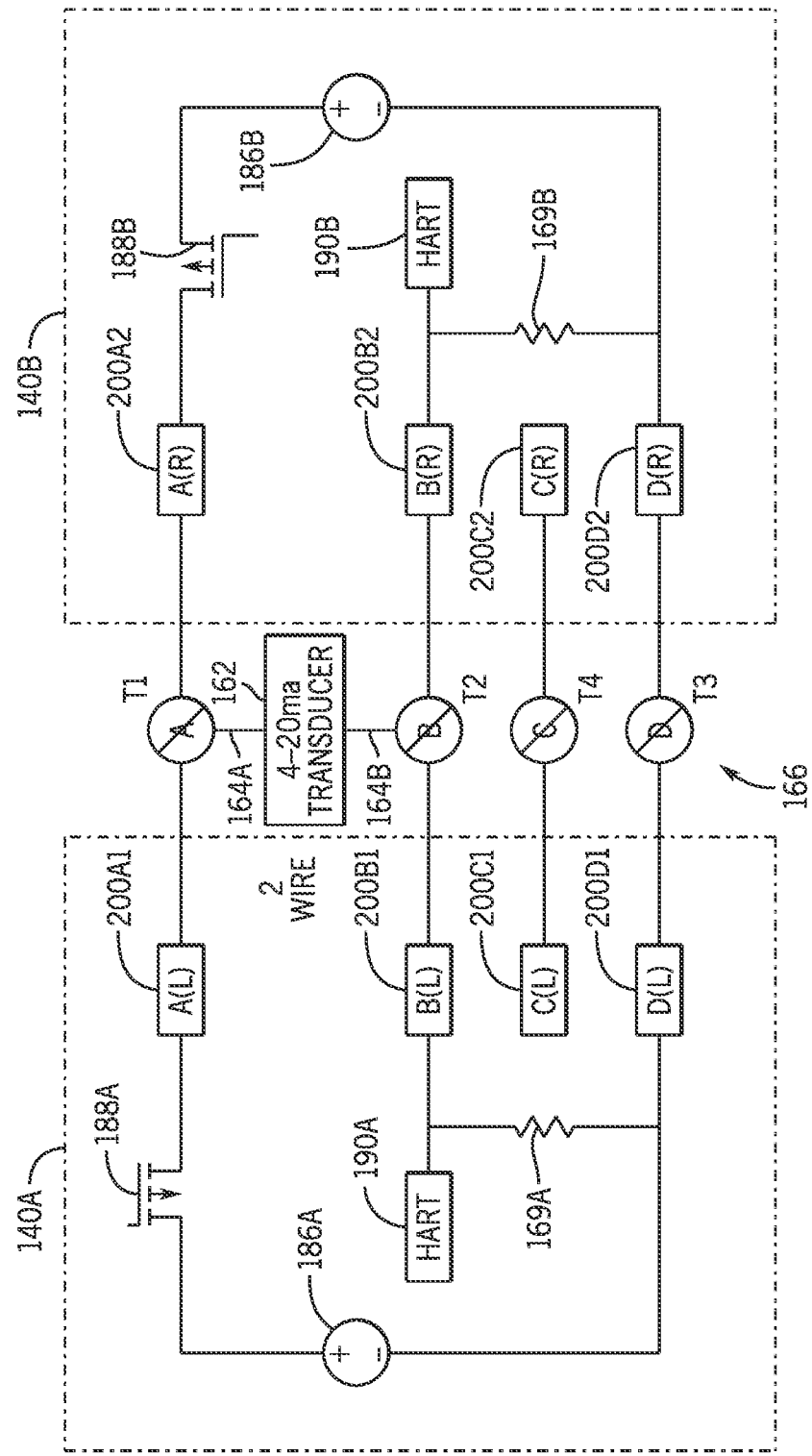
FIG. 7 is a circuit diagram of the first IO module and the second IO module being concurrently and redundantly coupled to a load via an analog input, in accordance with an embodiment.
Figure 8:
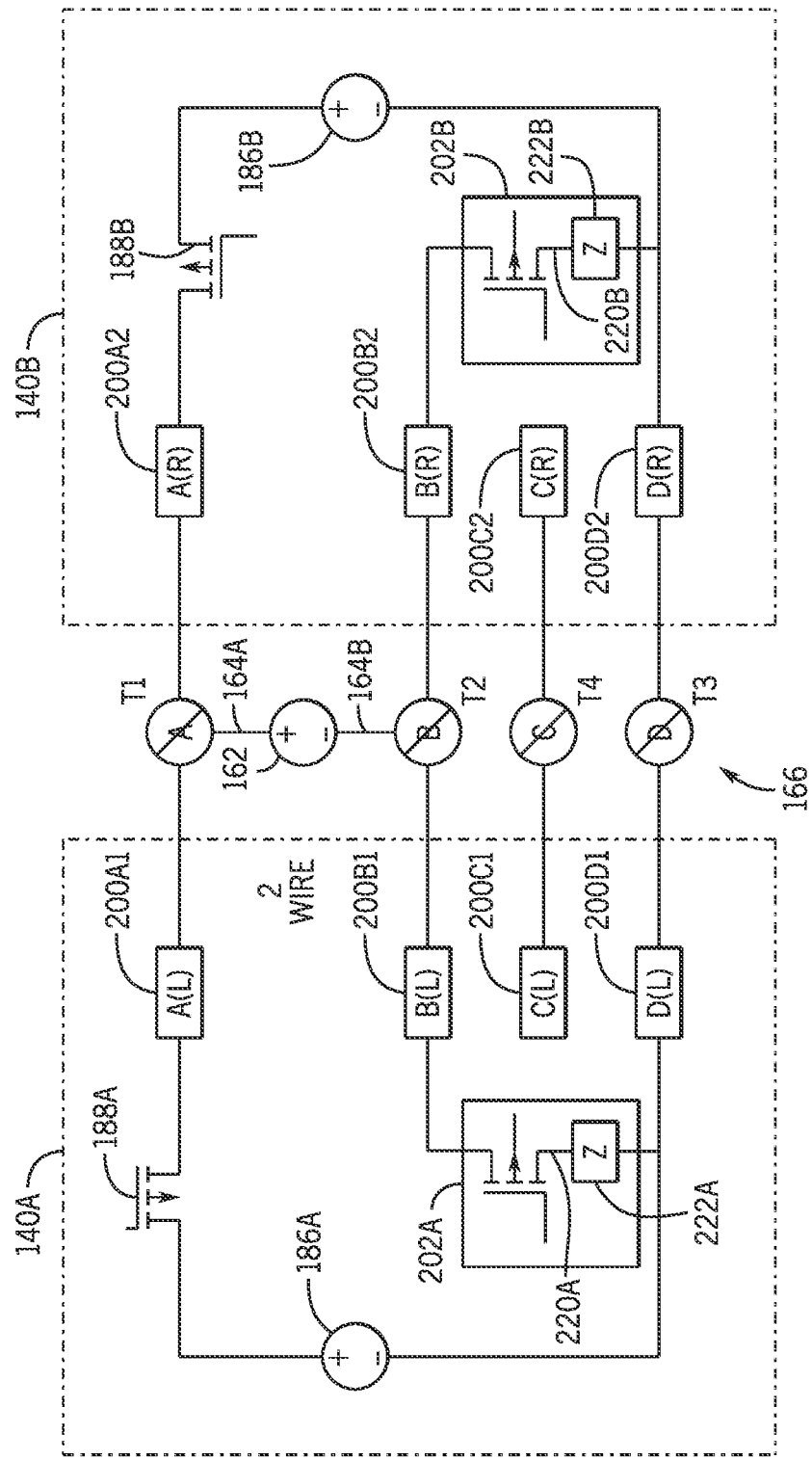
FIG. 8 is a circuit diagram of the first IO module and the second IO module being concurrently and redundantly coupled to a load via a digital output, in accordance with an embodiment.
Figure 9:
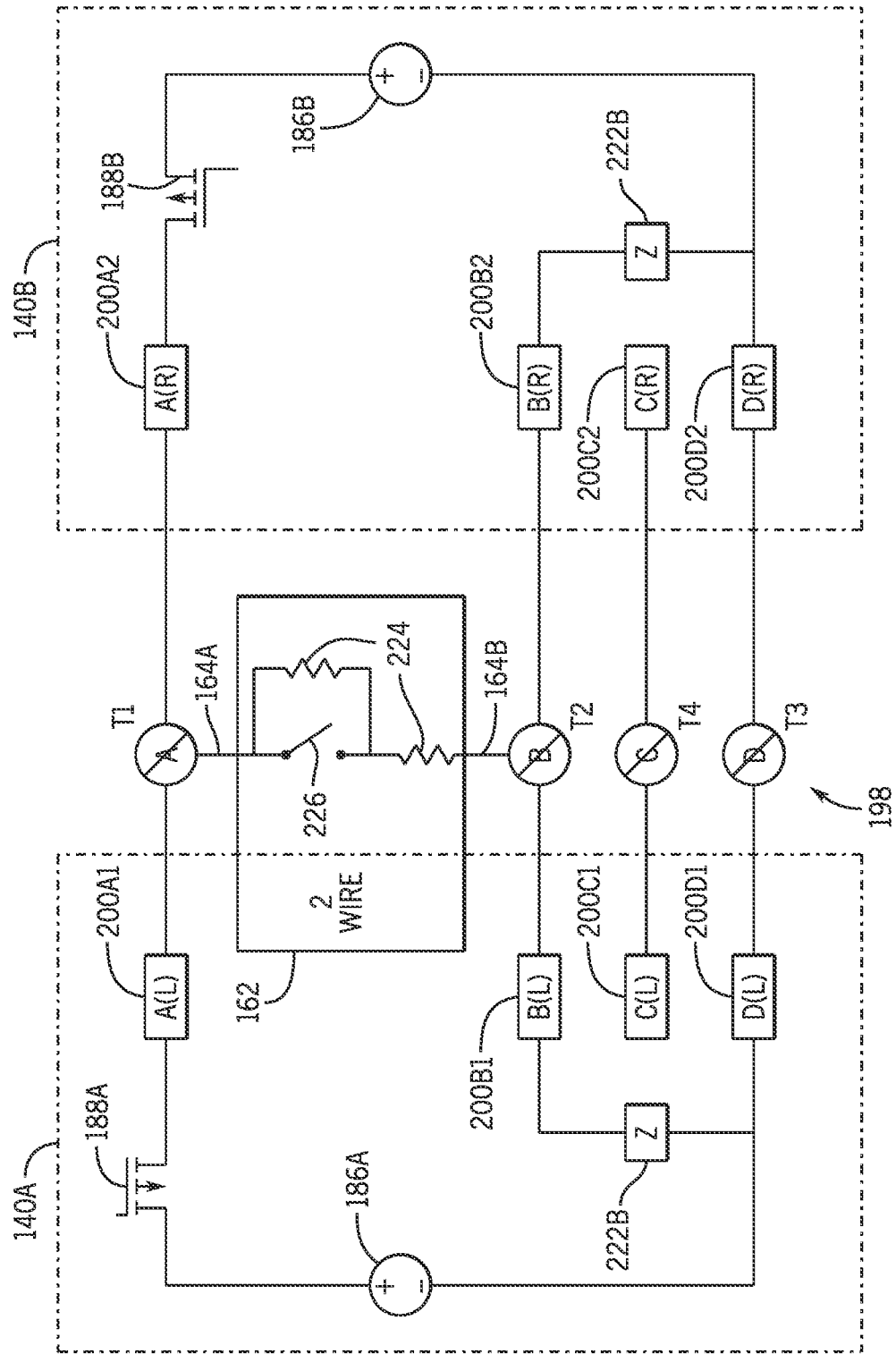
FIG. 9 is a circuit diagram of the first IO module and the second IO module being concurrently and redundantly coupled to a load via a digital input, in accordance with an embodiment.
Figure 10:
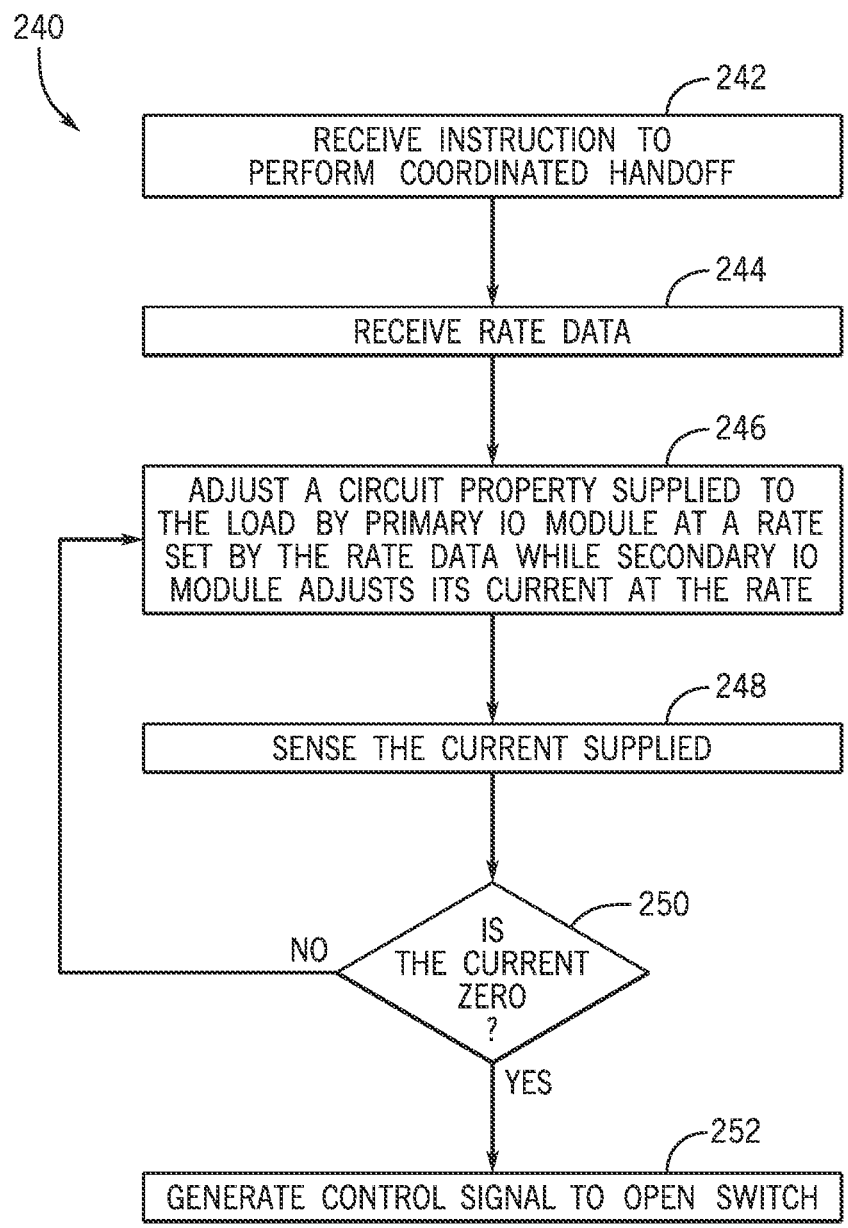
FIG. 10 is a flow diagram of a process for operating the first IO module to perform a coordinated handoff to the second IO module, in accordance with an embodiment.

With this in mind, the present embodiments described below include output control operations of the IO modules 140 jointly coupled to a shared downstream load, which may help to maintain balanced outputs from the redundant IO modules 140, trigger an intentional imbalance to diagnose whether both of the IO modules 140 are able to individually supply the downstream load in the event that one goes offline, and detect when one of the IO modules 140 is offline. One or more of the IO modules 140 may include universal IO circuitry to handle analog output signals, analog input signals, digital output signals, digital input signals or the like. FIG. 5 provides an example of the analog IO circuitry that may be included in the universal IO circuitry and FIGS. 6 and 7 show how this circuitry may be used to pair two or more IO modules 140 to share a load. FIGS. 8-10 show the same but for digital input and output circuitry and FIG. 11 provides an example method of operating one of the IO modules 140 to control output from that IO module to perform a coordinated handoff of the load to the other IO module 140. For ease of discussion, the IO module 140A is referred to herein as the primary IO module 140A and the IO module 140B is referred to as the secondary IO module 140B, though it should be understood that any of the IO modules 140 may operate as the primary or secondary IO module as long as coupled as a pair to a shared load. It should be further understood that operations performed by the primary IO module 140A and/or the secondary IO module 140B may be similarly performed by the other of the IO modules 140.

Continuing on now to discuss the universal IO circuitry, FIG. 5 is an example circuit diagram of a circuit portion 160 of the IO module 140A used to interface with a load 162. Earlier systems described a single universal IO module 140. Commonly-assigned U.S. Pat. No. 10,684,644, which is hereby incorporated by reference herein in its respective entirety, describe the universal IO module generally. However, it may be desired to couple two or more universal IO modules 140 together in a duplex configuration. By doing so, diagnostic operations may improve as well as availability of the system overall, as described above. Furthermore, although FIG. 5 is described in terms of a primary IO module 140A, it is noted that the circuitry is similar to that used in a secondary IO module 140B. In the circuit portion 160, the primary IO module 140A may share multiple terminals 166 (e.g., T1, T2, T3) with the secondary IO module 140B. Each terminal 166 may receive a respective electrical conductor, such as conductors 164A, 164B, 164C, in channels interfacing with a load 162, such as an industrial automation device, a sensor, another IO module 140, or the like. As shown in FIGS. 6-9, the load 162 may be shared with one or more IO modules that include the secondary IO module 140B. The conductors 164 are illustrated as phantom lines to indicate the various possibilities for connection to the load 162 according to various devices and/or modes. Accordingly, the conductors 164 may be wires (or other suitable conductor, such as traces, contacts, etc.) that electrically couple to the load 162, which may include sensors, actuators, and the like. The load 162 may be analog, digital, or HART devices, as may be desired at various points in the industrial automation system 46 and/or a process.

The conductors 164 may be releasably connected to the primary IO module 140A and the secondary IO module 140B at the terminals 166, as shown in FIGS. 6-9. The terminals 166 may be screw terminals, in which a screw driver may be used to releasably connect the conductors 164 to the primary IO module 140A and the secondary IO module 140B, or any suitable type of terminal.

Referring now to devices not shared between the IO modules 140, a variable resistance device, such as a switch device 168A, may be coupled to terminals 166 (e.g., T2 and T3) and provide a resistance (identified as "B") for the channel in line with the conductor 164B. The variable resistance device may be a transistor, such as a field effect transistor (FET), and in other embodiments may include resistors or other impedance components.

A control system 170A may include a processor and a memory device. The memory device may be a tangible and non-transistor device computer readable medium that stores instructions for the processor to execute to perform operations. The control system 170A may control transmission of signals from a voltage source 186A to the conductor 164A via a switch 188. This may control a channel resistance "A" provided in line with the conductor 164A.

The voltage source 186A being adjustable via the control system 170A may enable the duplex operation of the IO modules 140. The control system 170A may set the voltage output higher from the voltage source 186A than the output from corresponding voltage source 186B of a secondary IO module 140B, which may provide a "safety net" or operational buffer in the event of the primary IO module 140A being taken offline. The connected sensor or load 162 may not lose power when the primary IO module 140A is offline since the secondary IO module 140B takes over from a non-zero output state, resulting in fewer transients than switching in from a zero output state. Being able to adjust the voltage of the voltage sources 186 may also enable support for different types of field devices and IO communications standards and, protocols.

Furthermore, the control system 170A may selectably use a HART communication modem 190A when the load 162 supports HART communications. The HART communication modem 190A may be bidirectional and thus receive and transmit signals through the capacitors c1, c2. The HART communication modem 190A may couple to the voltage feedback line 174 (V_IN) via two or more wires (e.g., HART TX, HART RX) each having a capacitor c1, c2 in line with the HART communication modem 190A. When receiving HART formatted communications, the HART communication modem 190A may convert signals received into a format able to be processed by the control system 170A.

Furthermore, the control system 170A may be coupled to the variable resistance device, switch device 168A, and to an amplifier 172A. The control system 170A may control the variable resistance device to adjust the resistance "B" in the channel in line with the conductor 164B for a given operational mode and/or type of load.

The mode of operation may be selected from multiple operational modes. A mode of operation may be determined by the control system 170A from user input received at a screen of a remote device communicatively coupled to the control system 170A, a computing device of one of the levels 52-60 of the distributed control system 48, directly at the control system 170A and/or the primary IO module 140A, or the like. The user input may indicate specifications for the load 162, which the control system 170A may use to derive various set points including the resistance "B," may indicate the set point directly, or the like. Such a user input may indicate power, voltage, current, and/or signal frequency requirements for the load 162, whether the load 162 is a predetermined device types, such as a digital sensor, including an International Electrotechnical Commission (IEC) type 1, 2, 3, or NAMUR sensor, a digital actuator, an analog sensor, an analog sensor operating as a HART device, or an analog actuator, or a user defined device type. Determined modes of operation may then be set, such as digital output, digital input for IEC type 1, 2, 3 or NAMUR, analog output, analog input without HART communications, analog input with HART communications (which may be implemented with a 4-20 mA current loop), user defined, and so forth.

Each mode of operation may use a different resistance in the channel specific to the type of load 162. In some cases, the variable resistance devices may include a transistor or switch device 168 that changes resistance when a signal received at a gate terminal selectively biases the transistor to achieve a resistance in the channel suitable for the selected mode. The variable resistance device may include any suitable device that is able to change in resistance, such as a resistor ladder. The control system 170A may adjust a value of one or more of the variable resistance devices in response to the type of the load 162 and/or in response to additional information associated with the load 162 and/or the IO modules 140, and thus the values of the variable resistance devices may be programmed to same or different values. The type of the load may indicate whether the load 162 is a motor, a sensor, a control device or the like and/or what type of input or output is to be sent or received at the terminals 166. The additional information may include metering data collected about the IO modules 140 and/or the load 162, ambient temperatures, individual pathway impedances that may change over time, or the like. For example, an analog load 162 at a first temperature may use a different channel resistance than the same analog load 162 at a greater temperature, than a digital load 162 at the same first temperature, or the like.

The control system 170A may control the switch device 168 to provide the resistance in the channel corresponding to conductor 164B. To do so, the control system 170A may receive feedback from the channel for the amplifier 172A which, in turn, may provide the adjustment for the switch device 168A. The feedback may be delivered to the control system 170A on a voltage feedback line 174A (V_IN) and/or a current feedback line 176A (I_IN). Sometimes, the voltage feedback line 174A (V_IN) forms a node between the switch device 168 and the screw terminal 164 T2 and the current feedback line 176A (I_IN) forms a node between the switch device 168A and a current sensing resistor 178A. The current sensing resistor 178A may be a nominal resistor, such as 10 ohms (Ω), 15Ω, 20Ω, or the like, connected to a system ground (e.g., a system ground voltage, a ground). The control system 170A may calculate a resistance for the channel based on Ohm's Law (e.g., resistance equals voltage divided by current). Thus, the control system 170A may divide the voltage from the voltage feedback line 174A by the current from the current feedback line 176A to find the resistance of the variable resistance device. Based on the mode desired, the control system 170A may then adjust the resistance in the channel by adjusting a digital-to-analog converter (DAC) output 180A (ADJ) to an input of the amplifier 172A, such as the non-inverting input ("+"), so that the amplifier 172A, in turn, provides the adjustment to the variable resistance device through a biasing line 182A. The current feedback line 176A may also be provided to the other input of the amplifier 172A (e.g., inverting input "−") providing a reference signal. The amplifier 172A may be any suitable type of amplifier and may receive positive and ground reference signals from a power source 184A and a terminal to a system ground.

Each of the IO modules 140 may include the universal IO circuitry shown in FIG. 5 and the descriptions made above should similarly apply to an IO module having the universal IO circuitry, as will be appreciated. The secondary IO module 140B may concurrently and redundantly supply the load with the primary IO module 140A. In the event that the primary IO module 140A is taken offline, the secondary IO module 140B can step up to supply the load 162 with signals without interruption to the process that involves the load 162 and without introducing additional switching transients into the signals. FIG. 6 illustrates this connection with the shared load is an analog output load.

FIG. 6 is a circuit diagram of the primary IO module 140A from FIG. 5 and the secondary IO module 140B being concurrently and redundantly coupled to the load 162 to provide an analog output to the load 162. The primary IO module 140A and the secondary IO module 140B may share common terminals 166. Switches 200A1-D2 may interface between IO module 140 internal connections and the common terminals 166 and, when opened, electrically disconnect the IO modules 140 from the common terminals 166. The terminal T3 may ground the IO modules 140 to a system ground. The terminal T4 may be reserved for an additional coupling, such as to allow creation of relay modules, resistance-based temperature detector (e.g., resistance temperature detector (RTD)), thermocouple, differential voltage inputs, increased number of channel counts, or the like. Although the load 162 is shown between the terminal T1 and the terminal T2, it should be understood that the load 162 may couple to any suitable combination of the terminals, including each of the terminals T1, T2, T3, and T4. One example analog load 162 includes an actuator between terminal T1 and terminal T2 as the load 162.

The actuator of the analog load 162 may be a 4-20 mA device that adjusts a position of a component proportionally with respect to a signal value between 4 mA and 20 mA, such as valves, positioners or meters, or the like, where 4 mA may be a "0%" position and 20 mA may be a "100%" position, though any range of currents may be used to set a position of the actuator. In any case, the IO modules 140 may work together to control the total current provided to the load 162 via current sources 167A and 167B, the voltages sources 186A and 186B, or both. Since the voltage sources 186 are individually adjustable to different or same output values, one or more of the control systems 170 may steer current from the primary IO module 140A to the secondary IO module 140B, or vice versa. This steering enables the field device to avoid losing power under a single fault condition (e.g., when one of the IO modules 140 goes offline).

Indeed, both IO modules 140A and 140B may actively contribute current to load at least sometimes at a concurrent time. The IO modules 140 may share the load 50%/50% or according to another proportion, such as 60%40%. 70%/30%, or the like. For example, the primary IO module 140A may contribute 5 mA to the load 162 based on an output from current source 167A. While doing so, the secondary IO module 140B may contribute 5 mA to the load 162 based on an output from the voltage source 186B and an output from the current source 167B (e.g., that may include a variable resistance device), which may be set to different values than the voltage source 186A and the current source 167A to enable the primary IO module 140A to provide the voltage to the load 162 but enable each IO module 140 to equally source the currents.

Indeed, while the primary IO module 140A provides current to an analog output loop that includes the load 162, the secondary IO module 140B also contributes current to the analog output loop. In this way, both IO modules 140 are coupled to the common terminals 166 at the same time. The IO modules 140 may each provide 5 milliamps (mA) of current for a total of 10 mA to the load 162, but any current amount may be used based on IO module 140 specification and load 162 specification. Since the IO modules 140 are concurrently coupled to the load 162, if, during operation, the primary IO module 140A were to be taken offline, the secondary IO module 140B may increase the output of the current source 167B to contribute all of the 10 mA of current to the load 162. This transition from providing 5 mA to 10 mA by the secondary IO module 140B produces fewer switching transients and disruptions to the load 162 than a similar transition from 10 mA to 0 mA when the primary module 140A becomes unavailable and from 0 mA to 10 mA after the secondary IO module 140B connects to the load 162.

The respective control system 170A or 170B may control the respective switch 188A or 188B to selectively provide power from the respective voltage source 186A or 186B to terminal T1 in an output channel as used by the analog device. By way of operation, the conductor 164A may be connected to the terminal T1 and may provide power to the load 162, while the conductor 164B may be connected to the terminal T2 and provide a return path in a return channel in line with current sources 167A and 167B, from the load 162. Based on the load sharing instructions being implemented by the control systems 170, each respective control system 170A and 170B may coordinate control of the current source 167A and 167B to vary the current in the channel to maintain a desired current in the channel in accordance with a specified load sharing instructions.

With the foregoing in mind, the control systems 170 may receive an indication (e.g., fault, alert, request) that one of the IO modules 140 may be powered off or be removed from the circuit. As such, the control systems 170 may perform a coordinated handoff operation to ensure that the load 162 maintains its operation. By way of example, during the coordinated handoff operation, the control system 170A may cause its current source 167A to reduce its output current at the same rate that the control system 170B may cause its current source 167B to increases its output current, such that the load 162 experiences little change in total current. A first rate used by the current source 167A may be inversely proportional to a second rate used by the current source 167B. When current from the IO module 140A is near zero, the IO module 140A may disconnect itself from the terminals T1 and T2 via the switches 200A1 and 200B1, and the IO module 140B may then contribute the full loop current. As a result, engagement and disengagement of the IO module 140A may occur with minimal disruption to the process being implemented by the load 162. It is noted that the control systems 170 may perform similar coordinated handoff operations using voltages generated by the voltage sources 186. In this way, one or more of the voltage sources 186A, 186B may also be varied to control if the primary or secondary module 140A, 140B is "sourcing" current and/or power.

As described above, the IO modules 140 may sometimes be coupled to a shared load 162 that generates an analog signal, which the IO modules 140 receives as an analog input (equivalently referred to herein as an analog input load). FIG. 7 illustrates the pair of IO modules 140 that concurrently receive analog currents from the load 162 that supplies the analog input to the IO modules 140. That is, FIG. 7 is a circuit diagram of the IO module 140A and the IO module 140B being concurrently and redundantly coupled to the load 162 (e.g., transducer) that generates an analog signal that is provided to the IO modules 140 as an analog input signal. The load 162 is commonly coupled to the IO modules 140 between terminals T1 and T2. The load 162 may provide an analog signal to both of the IO modules 140 as an analog input signal. For example, the load 162 may include a 4-20 mA transducer that generates the analog signal.

Each IO module 140 may receive a portion of the total analog input from the load 162. The control systems 170 may determine a proportion of the analog input received by each IO module 140 based on the voltage measured across variable resistance devices 169 (169A, 169B). As such, when operating in an analog input mode, the loop current provided by the load 162 is split between the IO modules 140A and 140B, measured based on the voltages across variable resistance devices 169A and 169B, and reported to the opposite control systems 170A and 170B (or to a central control system), and summed by the respective control systems 170A and 170B to determine a total current provided by the load 162. With this in mind, when the IO module 140A is removed from the circuit, the control system 170B may adjust an impedance of the variable resistance device 169B to match the previous impedance coupled to the load 62 when the IO module 140A was connected to the terminals. In other words, during coordinated handoff, the IO module 140A may disconnect itself from the terminals T1 and T2, and the IO module 140B may increase impedance prior to the IO module 140A being removed to minimize disruption of the analog input current before the total loop current flows through only the IO module 140B. Increasing the impedance before removing the IO module 140A may be desired when using analog inputs that support HART communications since the HART communication modems 190 expect the input to be a within a range of impedance (e.g., input corresponding to terminal T2 and/or terminal T3). As a result of the impedance adjustment occurring before removal, input current reading reported to the control system 170A or 170B remains accurate and disruption is minimized or eliminated.

By way of operation, the respective control systems 170 may sense the portion of the total analog input for its corresponding IO module 140 and sum an indication of that portion with an indication of the other portion of the total analog input to determine the total analog input. For example, the control system 170A senses the analog input received by the IO module 140A and transmits the measurement to the control system 170B, which combines the measurement by the control system 170A with its own measurement of the analog input received by the secondary IO module 140B.

When operated in an analog input with HART communications operational mode, such as when the load 162 includes HART compatible devices, the conductor 164B, connected to the terminal T2, may provide an analog input signal from the load 162 to the HART communication modems 190. The HART communication modems 190 may respectively process the input analog signal for use by each of the control systems 170. The conductor 164A, connected to the terminal T1, may provide a return path to the load 162. In the input path (e.g., channel coupled to terminal T2), the control system 170 may respectively control the variable resistance device 169 to adjust the resistance in the channel to facilitate HART operations.

As described above, the shared load 162 may sometimes be a digital load. Indeed, the universal IO circuitry of FIG. 5 may, in addition to the analog IO loads, also be used to couple to one or more digital input loads and/or digital output loads. Example digital loads are shown in FIGS. 8 and 9.

Continuing now to discuss the digital IO circuitry configurations of the universal IO circuitry, FIG. 8 is a circuit diagram of the primary IO module 140A and the secondary IO module 140B being concurrently and redundantly coupled to the load 162 to provide a digital output to the load 162. In this example, the load 162 may be a digital load device that includes digital logic state devices 202 (202A, 202B) may include a digital switches 220 and current sense devices 222, and the load 162 may be any suitable device that receives a digital output from the IO modules 140. The digital switches 220 may include one or more redundant switches in series on the terminal T2 to provide improved fault tolerance, improved disconnection or connection, improved availability (e.g., in case one switch no longer changes opens or closes), or the like, relative to a device that includes fewer switches or no switches. The digital output here is a two-wire output but any suitable digital load may be used that receives a digital signal to perform operations (e.g., binary, high voltage, low voltage). The load 162 may include digital actuators such as indicator lights or small motors. In some systems, an external power source in series with the load 162 may be connected between the terminal T2 and terminal T3.

The control systems 170 may respectively control switches 188 as required by the digital device. The control system 170A may generate and send a control signal to the switch 188A and the control system 170B may generate and send a control signal to the switch 188B. A conductor 164A, connected to the terminal T1, may provide such selectively delivered digital signal to the load 162. A conductor 164B, connected to the terminal T2, in turn, may provide a return path in a return channel (channel corresponding to terminal T2), in line with the digital logic state devices 202, from the load 162. In the return path (channel corresponding to terminal T2), the control systems 170 may control the digital logic state devices 202 to minimize the resistance in the channel, such as by opening the digital switch 220A, the digital switch 220B, or both to cause the effective impedance to become 0Ω, and thus allow the load 162 to receive a high voltage signal from the IO modules 140.

In this digital output mode, the digital switches 220A and 220B may be used as redundant FET switches that are turned on and off to respectively control a current through current sense devices 222A and 222B that may sense the current. The control systems 170A and 170B may respectively receive indications from the current sense devices 222A and 222B that indicate the sensed current. The control systems 170A and 170B may respectively turn on and/or off the digital switches 220A and 220B.

In some embodiments, a separate, parallel path coupled between the terminal T2 and the terminal T3 may provide the digital output to a load also coupled to the terminal T2 and T3. This separate parallel path may be provided in addition to or in alternative of the path depicted in FIG. 8 between the terminal T1 and the terminal T2.

With the foregoing in mind, while operating in a digital output mode, during normal operation both I/O modules 140 may be coupled to the terminals T1 and T2, and thus the load 162, and outputting the same digital state (e.g., high voltage, low voltage, high current, low current, high impedance, low impedance). During the coordinated handoff, in one example, the IO module 140A may disconnect itself from the terminals T1 and T2 via the switch 200A1, 200B1, or both. Since the IO module 140B is still connected to the terminals T1 and T2 and producing the same digital state as the IO module 140A was previously producing, the load 162 may not experience a disruption.

In addition to operating in the digital output mode, the IO modules 140 may operate in a digital input mode, such that the shared load 162 may provide a digital input signal. FIG. 9 illustrates the pair of IO modules 140A, 140B when coupled to the shared load 162 that is providing a digital signal to the pair of IO modules 140A, 140B. Referring to FIG. 9, the primary IO module 140A and the secondary IO module 140B may be concurrently and redundantly coupled to the load 162 to receive a digital input signal from the load 162. The load 162 may be a digital load device that includes resistors 224 and a switch 226 that may generate a digital signal based on the position of the switch 226 (e.g., digital high for closed switch, digital low for open switch). The IO modules 140 may receive the digital signal as a digital input.

The digital signal may be an alarm signal, a signal indicative of a measurement, such as a temperature measurement, a voltage measurement, a current measurement, or the like. Additionally, the load 162 may provide digital signals that correspond to IEC type 1, 2, 3 digital sensors, such as photoelectric sensors, dry contact sensors, inductive sensors, push buttons, a NAMUR sensor, or the like.

By way of operation, for example, when the IO modules 140A, 140B operate in a digital input mode, both IO modules 140A and 140 B during normal operation are connected to the terminals T1 and T2 and read the same state from the load 162 during normal operation. During the coordinated handoff operation, in one example, the IO module 140A may disconnect itself from the terminals T1 and T2 via the switches 200A1, 200B1, or both. Since the remaining IO module 140B is still connected to the terminals T1 and T2, the devices relying on the digital input signal from the load 162 to operate may continue to operate based on the signal provided via the IO module 140B. As a result, there is no disruption from the perspective of the input device.

Keeping the foregoing in mind, the control systems 170 may determine to adjust an output signal, impedance, or other suitable property from one or both of the IO modules 140 based on the operating mode (e.g., analog input, analog output, digital input, digital output). In the analog operation modes, the adjustments may balance output signals (e.g., an output power, an output voltage, an output current) from each of the IO modules 140 according to a set contribution amount, such as a 50%/50% proportion, or may intentionally imbalance the output signals to a set contribution amount, such as a 60%/40% proportion, 30%/70% proportion, 0%/100%, an X %/Y % proportion or the like to perform a coordinated handoff operation.

The concurrent operation may be used to also perform diagnostic operations. For instance, the control systems 170 may incrementally adjust the output signals by making one change, testing a measured output value against a threshold, and making an additional change if the measured output value is greater than or less than a target threshold related to verifying that the respective IO module 140 may be capable of perform the requested operation. Sometimes the adjustment may be to shift the shared load 162 from being supplied by both of the IO modules 140 to just being supplied by one of the IO modules 140. This may occur when the control systems 170 are testing a supply output capability of an IO module 140 or when disconnecting an IO module 140 for maintenance and it is desired to avoid disturbing the load. Indeed, to do so, the control systems 170 may perform a coordinated handoff to decrease an output signal from one of the IO modules 140A, 140B at a rate that matches that used to increase an output signal from the other IO module 140B, 140A, where the coordinated handoff may continue until output signal from the IO modules 140A, 140B has reached a target value. The respective rates used by the IO modules 140A, 140B may be inversely proportional to each other (e.g., 1/X). Both IO modules 140 need not know that one of the IO modules 140 is being taken offline, and in some cases, the coordinated handoff is actively controlled by one of the IO modules 140 but followed automatically by the other IO module 140.

In the event of an unplanned outage of the primary IO modules 140A, that primary IO module 140A may disconnect itself from the common terminals 166, such as to bring itself to a safe state. However, in the case of the unplanned outage, overall impact to the load 162 may be reduced from using the pair of concurrent IO modules 140 due to fewer switching transients associated with supplying the load 162 instead with the secondary IO module 140B.

With the foregoing in mind, FIG. 10 is a flow diagram of a process 240 for operating the primary IO module 140A to perform a coordinate handoff of the load 162 from being supplied by both the primary IO module 140A and the secondary IO module 140B to instead being supplied by just the secondary IO module 140B in analog input and output modes. The coordinated handoff may be used to adjust the terminal T1 voltages output and/or current output by each of the IO modules 140A and 140B. The process 240 is described as being performed by the control system 170A and it should be understood that substantially similar operations are able to be performed by either control system 170, another control system associated with the distributed control system 48 (e.g., IO module 98 (control)), or the like. These operations may be performed in response to processing circuitry of control system 170A executing instructions stored in a tangible, non-transitory, computer-readable medium, such as a memory of the control system 170A, or another suitable memory. Moreover, the operations of the process 240 are shown in a particular order; however, some of the operations may be performed in a different order than what is presented or omitted altogether. Certain voltage and current values are described herein, but it should be understood that these are example values and example ranges, which may be adjusted for specific systems and implementations.

At block 242, the control system 170A may receive an instruction to perform a coordinated handoff of the load 162 to the secondary IO module 140B. The instruction may correspond to a start of a diagnostic operation on the primary IO module 140A, correspond to a user input indicating the initiation of a maintenance operation, a request to place the IO module 140A offline, or the like. The control system 170A itself may trigger generation of the instruction and/or one of the IO modules 98 may generate the instruction in response to a condition being met to trigger the diagnostic operation, in response to user input, in response to a duration of time passing, detection of a fault, or the like.

At block 244, the control system 170A may receive rate data. The rate data may define a rate at which the control system 170A is to use to decrease current, voltage, impedance, or other electrical circuit property associated with a relationship between the primary IO module 140A, the secondary IO module 140B, and the load 162. The control system 170A may receive the rate data from operator input to the control system 170A, the IO module 98 (control), the primary IO module 140A itself, or the like. Classes of an equipment load and/or IO modes of the primary IO module 140A may use different rates. For example, different loads may correspond to different rates of changes to decrease a current supplied to shift the load 162 to the secondary IO module 140B. The rate data may be stored in a memory and/or a data structure. In some cases, the rate data may remain unchanged for the different classes of an equipment load and/or the IO modes of the primary IO module 140A.

At block 246, the control system 170A may adjust the circuit properties (e.g., current, voltage, impedance) supplied to the load 162 by the primary IO module 140A at a rate set by or based on the rate data while the secondary IO module 140B adjusts its circuit property supplied to the load 162 at the rate to compensate for the loss of the circuit properties provided by the IO module 140A. To do so, the control system 170A may decrease a current output from the primary IO module 140A at a rate based on the rate data associated with the instruction and the control system 170B may increase a current output from the secondary IO module 140B at a matching rate. Adjusting a current output from either of the IO modules 140A, 140B may involve transmitting one or more commands the current sources 167, the variable resistances 169, the digital logic state devices 202, current sense devices 222, or similar current-adjusting components of the IO modules 140A, 140B. The one or more commands may adjust one or more impedances or properties of the devices to adjust the current output from the IO module 140A, 140B. In one embodiment, for example, the rate data may define an amount of current to be output from the IO modules 140 over time ($\Delta i/\Delta t$), where the amount of current may incrementally decrease in value repeatedly over time. Any suitable may way be used to communicate the rate data to the control system 170B. For example, the control system 170A may transmit the rate data to the control system 170B, to the secondary IO module 140B, or the like. The control system 170B may have the rate data stored in memory or may have received the rate data from operator input. Regardless, the control system 170B may receive an indication from the control system 170A to perform the coordinated handoff, such as via the instruction in block 242 or by separate indication, and consequently operate to increase the current output by the secondary IO module 140B at a rate matching that of the first IO module 140A. Matching a rate of decrease of current supplied to the load 162 to a rate of increase of a current supplied to the load 162 may ensure that the load 162 is not dropped from lack of current or low current. The rate of decrease may be inversely proportional to the rate of increase. The current from the primary IO module 140A may continue to decrease until the primary IO module 140A supplies zero current to the load 162.

To verify that zero current is output from the primary IO module 140A to the load 162, at block 248, the control system 170A may sense the current supplied by the primary IO module 140A to the load 162 and determine, at block 250, whether the current supplied is zero. One or more sensors may detect the current and/or voltage supplied to the load 162. The current may be determined by dividing the voltage supplied to the load 162 by the resistance affecting the current supplied to the load 162, which may include a resistance of the variable resistance devices 169 at the time of measurement of the voltage. In some cases, to verify that a zero current is output, the control system 170A may determine whether an impedance of the primary IO module 140A equals a threshold value. The threshold value may correspond to an impedance value known to result in a zero current output from the target IO module 140. The threshold value may be a resistance value, a capacitance value, an inductance value, or any combination thereof.

If the current supplied is determined to not be zero, at block 250, the control system 170A may continue to decrease the current supplied at block 246 and may repeat, at block 248, the measurement of the current and/or voltage supplied to the load 162. This may repeat until the current supplied by the primary IO module 140A is zero. When the current supplied by the primary IO module is determined to be zero, at block 250, the coordinated handoff may be completed, and the control system 170A may generate, at block 252, a control signal to open switches 200A1-200D1 of the primary IO module 140A. Opening the switches 200A1-200D1 may electrically decouple the primary IO module 140A from the load 162 to enable maintenance or replacement of the primary IO module 140A without interfering with operation of the load 162 since the load is providing or receiving analog signals to or from the IO module 140B. If the control system 170A performed the coordinated handoff to test that the secondary IO module 140B can supply the load 162 with a full load current, the control system 170A may not generate the control signal to open the switches 200A1-D1. In this case, the control system 170A may generate an alert and/or a control signal to notify the control system 170B that the load 162 has been handed off and that a diagnostic of a current supplied by the secondary IO module 140B may commence.

In some embodiments, processing circuitry, such as the IO modules 98, other upstream control circuitry, or one or more control systems 170 may receive an instruction to perform a coordinated handoff of a digital load to one of the IO modules 140, such as handing off the load from being coupled to both IO modules 140A and 140B to being coupled to the secondary IO modules 140B. The processing circuitry may detect a first digital state of the primary IO module 140A in response to receiving the instruction and may detect a second digital state of the secondary IO module 140B. The processing circuitry may send a command to open at least one switch of the first IO module 140A to disconnect the first IO module 140A from the load 162 in response to determining that the first digital state and the second digital state are the same. After disconnecting the primary IO module 140A, the load 162 communicates with the secondary IO module 140B without communicating with the primary IO module 140A.

By providing the load 162 with the concurrently coupled IO modules 140, data transmitted from or received by the load 162 is not likely to be lost in the transition between using the IO modules 140 to interface with the load 162. For example, one of the IO modules 140 is able to receive the output from the load 162 even while the other IO module 140 is being taken offline with minimal downtime or loss of power. This may improve industrial automation system operation by providing more continuous visibility over the output values relative to a system that may have let the output transmit before a backup IO module was connected to the load 162, which may lose changes in the output ongoing while connecting the backup IO module. This data lost may be useful in debugging system operations and/or determining why the IO module 140 was taken offline in the first place. Thus, operation and/or reliability of the industrial automation system may improve by having increased visibility to outputs from load 162 to include visibility to the outputs even while switching over an IO module 140 supplying that load 162.

Diagnostic capabilities associated with upstream concurrent and redundant power supplies may further improve industrial automation system operation by making it more likely that a misoperation may be detected early and making it easier to detect locations of faults using internal sensing circuitry of the IO power modules. Furthermore, IO modules with a universal IO configuration may provide additional benefits, such as providing a distributed control system that may be less complex to maintain.

It is noted that in each of the examples described above, the load 162 is depicted as a two-wire load. However, it should be understood that similar or same systems and methods may be applied to three or more wire loads. For example, the load 162 may couple to the IO modules 140 via three-wires or four-wires, or any suitable number of wires.

Technical effects of the systems and methods described herein include using redundant and at least partially concurrently operating IO modules having universal IO circuitry to supply a shared load. Although able to be operated individually, the redundant IO modules may couple to a shared load and concurrent supply some amount of signals to the shared load during normal operations. Proportions of signals supplied to the shared load may be adjusted to perform diagnostic operations and/or in response to one of the modules becoming unavailable. Indeed, by using these redundant and concurrently operating IO modules described herein, the industrial automation system operation may improve by being able to switch between primary and secondary IO modules interchangeably and without abrupt or sudden switching operations, which can introduce switching transients and reduce life of industrial automation components associated with the primary and secondary IO modules and/or a load of the primary and secondary IO modules. Furthermore, the redundant and concurrently operating IO modules may increase visibility to load outputs even when handing the load off from an IO module supplying that load by ensuring that another IO module remains coupled to the load during the coordinated handoff, thereby improving operation and/or reliability of the industrial automation system.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a first input/output (TO) module configured to output a first current output, wherein the first IO module is coupled to a first terminal and a second terminal;
a second IO module configured to output a second current output, wherein the second IO module is coupled to the first terminal and the second terminal;
a load device coupled to the first terminal and the second terminal, wherein the load device is configured to operate based on the first current output and the second current output; and
one or more control systems configured to:
 receive an instruction to perform a coordinated handoff to the first IO module;
 generate a first command to increase the first current output at a first rate based on rate data associated with the instruction;
 send the first command to the first IO module to increase the first current output in response to receiving the instruction;
 generate a second command to decrease the second current output at a second rate based on the rate data; and
 send the second command to the second IO module to decrease the second current output.

2. The system of claim 1, wherein the first rate is inversely proportional to the second rate.

3. The system of claim 1, wherein the one or more control systems is configured to send the first command to a first current source part of the first IO module.

4. The system of claim 1, wherein the one or more control systems is configured to open at least one switch of the second TO module after the first TO module increases the first current output.

5. The system of claim 1, wherein the one or more control systems is configured to open at least one switch of the second TO module after the second TO module decreases the second current output to zero.

6. The system of claim 1, wherein the load device is configured to operate based on an amount of current received from the first TO module, the second TO module, or both.

7. The system of claim 1, wherein the first TO module and the second TO module are configured to concurrently provide the first current output and the second current output during a normal operation.

8. The system of claim 1, wherein the load device is configured to couple to the first TO module and the second TO module via a third terminal and fourth terminal different from the first terminal and the second terminal.

9. A system, comprising:
a first input/output (TO) module configured to receive a first current input, wherein the first TO module is coupled to a first terminal and a second terminal;
a second TO module configured to receive a second current input, wherein the second TO module is coupled to the first terminal and the second terminal;
a load device coupled to the first terminal and the second terminal, wherein the load device is configured to output the first current input and the second current input; and
one or more control systems configured to:
 receive an instruction to perform a coordinated handoff to the second TO module;
 generate a first command to adjust a first resistance according to a first rate based on rate data associated with the instruction;
 send the first command to the first TO module to adjust the first resistance of the first TO module in response to receiving the instruction;
 generate a second command to adjust a second resistance according to a second rate based on the rate data; and
 send the second command to the second TO module to adjust the second resistance of the second TO module.

10. The system of claim 9, wherein the first rate is inversely proportional to the second rate.

11. The system of claim 9, wherein the first command is configured to modify an impedance of a variable resistor of the first TO module.

12. The system of claim 9, wherein the one or more control systems is configured to open at least one switch of the first TO module after the first TO module adjusts the first resistance.

13. The system of claim 9, wherein the one or more control systems is configured to open at least one switch of the first TO module after the first resistance reaches a threshold resistance.

14. The system of claim 9, wherein the first TO module and the second TO module are configured to concurrently receive the first current input and the second current input, respectively, during a normal operation.

15. The system of claim 9, wherein the load device configured to couple to the first TO module and the second TO module via a third terminal and fourth terminal different from the first terminal and the second terminal.

16. A method, comprising:
 receiving, via processing circuitry, an instruction to perform a coordinated handoff of a digital load device to a first input/output (TO) module, wherein the digital load device is coupled to the first TO module and a second TO module via at least two terminals;
 detecting, via the processing circuitry, a first digital state of the first TO module in response to receiving the instruction;
 detecting, via the processing circuitry, a second digital state of the second TO module;
 generating, via the processing circuitry, a first command to increase the first digital state of the first TO module at a first rate based on rate data associated with the instruction;
 generating, via the processing circuitry, a second command to decrease the second digital state of the second TO module at a second rate based on the rate data; and
 sending, via the processing circuitry, a command to open at least one switch of the second TO module to disconnect the second TO module from the digital load device in response to determining that the first digital state and the second digital state are the same.

17. The method of claim 16, wherein the digital load device is configured to transmit an alarm signal, a signal indicative of a measurement, or any combination thereof, to the first TO module, the second TO module, or both.

18. The method of claim 16, wherein the digital load device is configured to receive an alarm signal, a signal indicative of a measurement, or any combination thereof, from the first TO module, the second TO module, or both.

19. The method of claim 16, comprising generating the first command to increase the first digital state at the first rate inversely related to the second rate.

20. The method of claim 16, wherein the first digital state corresponds to a voltage.

\* \* \* \* \*